United States Patent [19]

Walk et al.

[11] Patent Number: 4,828,322

[45] Date of Patent: May 9, 1989

[54] HINGE JOINT FOR THE SEATS OF AUTOMOTIVE VEHICLES AND THE LIKE

[75] Inventors: Hansjörg Walk, Reutlingen; Heinz J. Wagener, Remscheid, both of Fed. Rep. of Germany

[73] Assignee: Keiper Recaro GmbH & Co., Remscheid, Fed. Rep. of Germany

[21] Appl. No.: 165,753

[22] Filed: Mar. 9, 1988

[30] Foreign Application Priority Data

Mar. 21, 1987 [DE] Fed. Rep. of Germany ....... 3709403

[51] Int. Cl.⁴ .............................................. B60N 1/02
[52] U.S. Cl. .................................... 297/362; 297/355
[58] Field of Search ......................... 297/362, 366, 355

[56] References Cited

U.S. PATENT DOCUMENTS

| | | | |
|---|---|---|---|
| 4,025,109 | 5/1977 | Klingelhofer et al. | 297/362 |
| 4,113,305 | 9/1978 | Hampton | 297/85 |
| 4,196,931 | 4/1980 | Werner | 297/362 |
| 4,407,544 | 10/1983 | Bahring | 297/362 |
| 4,453,767 | 6/1984 | Walk et al. | 297/362 |
| 4,504,091 | 3/1985 | Ohshiro | 297/362 |
| 4,634,181 | 1/1987 | Pipon | 297/362 |
| 4,708,392 | 11/1987 | Werner et al. | 297/355 |
| 4,715,656 | 12/1987 | Walk et al. | 297/362 |

Primary Examiner—Francis K. Zugel
Attorney, Agent, or Firm—Peter K. Kontler

[57] ABSTRACT

A hinge joint for use in the seats of motor vehicles to bring about changes of inclination of the back of the seat has a first component which is secured to the body supporting portion of the seat, a second component which is affixed to the back of the seat, and a shaft which has an eccentric cylindrical portion rotatably journalled in the first component and two conical portions which are disposed at opposite axial ends of the cylindrical portion and are received in complementary openings of two spaced-apart sections of the second component. A diaphragm spring biases the shaft axially to urge the conical portions deeper into the respective openings. Eventual changes of orientation of the shaft in response to the application of external stresses to the back during adjustment of its inclination do not entail a pronounced increase of the force which is required to turn the shaft for the purpose of adjusting the inclination of the back because the elastic deformation of component parts of the hinge joint and radial tolerances between the gears of the transmission which is installed between the components are compensated for by large-area contact between the conical portions of the shaft and the respective component. This renders it possible to make the shaft and the components of the hinge joint of less expensive lightweight material.

11 Claims, 3 Drawing Sheets

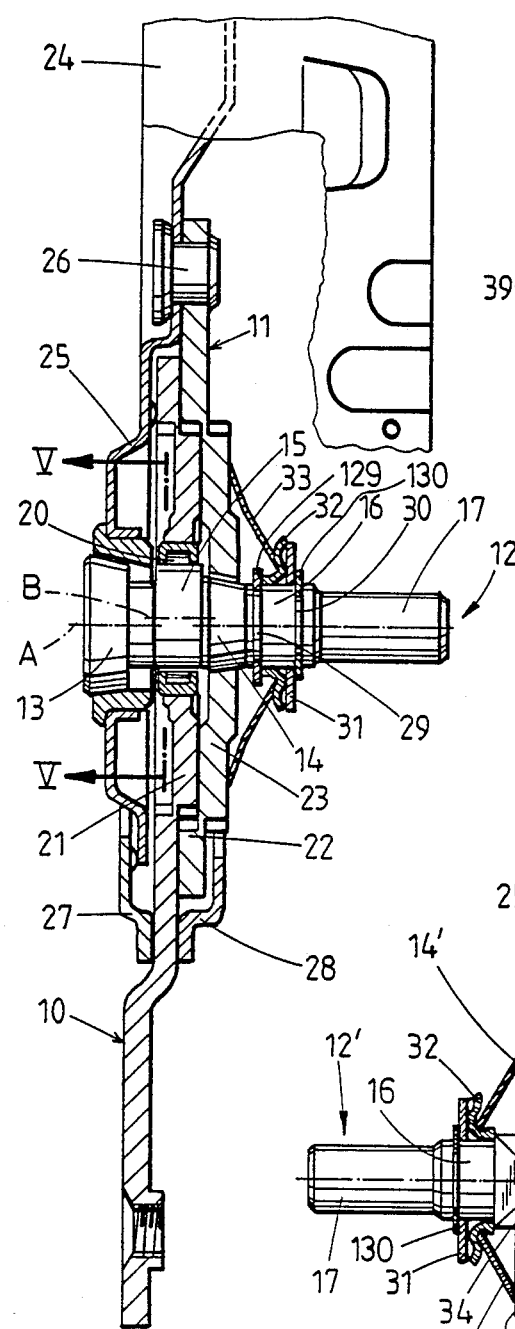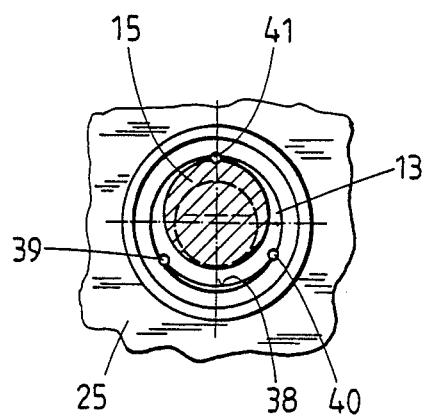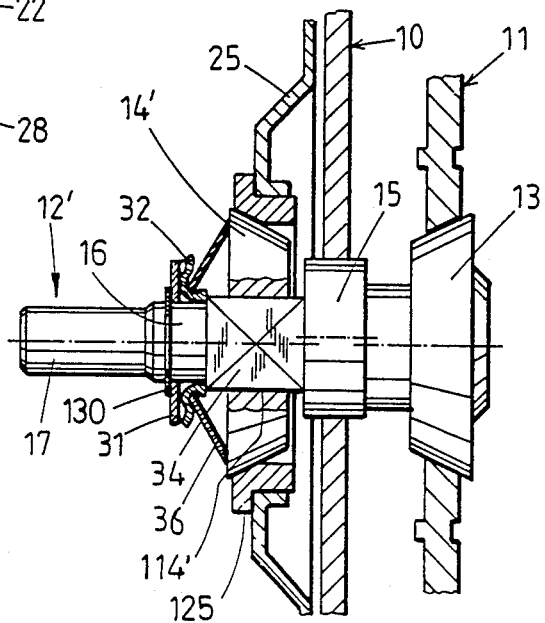

HINGE JOINT FOR THE SEATS OF AUTOMOTIVE VEHICLES AND THE LIKE

CROSS-REFERENCE TO RELATED CASES

The hinge joint of the present invention constitutes an improvement over and a further development of hinge joints which are disclosed in commonly owned U.S. Pat. No. 4,708,392 granted Nov. 24, 1987 to Werner et al. for "Hinge joint for the seats of automotive vehicles and the like".

Other types of hinge joints are disclosed in commonly owned U.S. Pat. No. 4,563,039 granted Jan. 7, 1986 to Jörg for "Hinge joint for use in the seats of motor vehicles and the like" and in commonly owned copending patent application Ser. No. 157,466 filed Feb. 17, 1988 by Werner et al. for "Hinge joint for seats of motor vehicles and the like".

BACKGROUND OF THE INVENTION

The invention relates to improvements in hinge joints, especially to improvements in hinge joints of the type suitable for use in the seats of motor vehicles. More particularly, the invention relates to improvements in hinge joints of the type wherein two components or leaves are pivotably and radially movably connected to each other by an axially movable coupling member. Still more particularly, the invention relates to improvements in hinge joints of the type wherein a gear transmission or other suitable locking means serves to releasably hold the components of the hinge joint in selected angular positions relative to each other and the locking means comprises an eccentric on the coupling member.

Published European patent application No. A 0048 294 discloses a hinge joint wherein the eccentric of the coupling member constitutes a conical frustum which is surrounded by one of the components, for example, by a spur gear forming an integral part of one of the components. The other component of the hinge joint has two sections which surround, with a certain amount of play, two cylindrical portions of the coupling member. The eccentric is disposed between the cylindrical portions of the coupling member, and the latter is biased axially by a spring so that the eccentric is urged deeper into the complementary opening of the one component. In order to permit a change of inclination of the components relative to each other, the coupling member must be rotated relative to the one component with a force which is sufficient to overcome friction between the parts of the coupling member and the parts of the two components. As such time, a combined force including sliding friction and the restoring force of the spring is weaker than the axial force resulting from radial forces acting upon the coupling member. Thus, the eccentric is shifted axially to thereby account for manufacturing tolerances including radial play between the teeth of gears of the locking means and the clearances between the cylindrical portions of the coupling member and the other component. This ensures that the inclination of the back of the seat which employs one or more hinge joints of the just outlined character can be changed with the exertion of a relatively small force. When the adjustment is completed, the spring moves the coupling member axially to thus eliminate radial play between the gears of the locking means as well as the play between the cylindrical portions of the coupling member and the other component of the hinge joint.

It has been found that the inclination of the back of the seat can be changed in response to the exertion of a relatively small force only if the adjustment of the back is not opposed by an external force, such as the pressure which is exerted by the body of the occupant of the seat. Therefore, the occupant of the seat must lean forwardly to terminate the application of a force against the back of the seat preparatory to and during each adjustment of inclination of the back. The reason for a pronounced increase of resistance to changes of the angular position of the coupling member while the back is acted upon by one or more external forces is that such external force or forces entail the development of radially oriented forces which tend to jam the coupling member so that the latter cannot be readily rotated relative to the one component. Inherent elasticity of parts of the hinge joint also contributes to the need for the exertion of a greater force in order to turn the coupling member while the back of the seat is being acted upon by one or more external forces. When the inclination or orientation of the coupling member relative to the components of the hinge joint deviates from the normal or expected orientation, the area of contact between the coupling member and the components of the hinge joint is reduced considerably; this entails the development of pronounced and highly localized frictional forces which oppose angular movements of the coupling member.

OBJECTS AND SUMMARY OF THE INVENTION

An object of the invention is to provide a novel and improved hinge joint which is constructed and assembled in such a way that it exhibits all advantages but does not exhibit the drawbacks of the aforediscussed conventional hinge joints.

Another object of the invention is to provide a hinge joint wherein the coupling member can be caused to change its angular position (preparatory and/or during adjustment of the inclination of one component relative to the other component) in response to the application of a relatively small force, even if the component whose inclination is to be changed is being acted upon by one or more external forces.

A further object of the invention is to provide a seat which embodies one or more hinge joints of the above outlined character.

An additional object of the invention is to provide a novel and improved coupling member for use in the above outlined hinge joint.

Still another object of the invention is to provide a hinge joint which can eliminate radial play between its parts when the adjustment of the components relative to each other is completed and, in addition to such capability to eliminate radial play, is also capable of ensuring that the adjustment can be carried out by rotating the coupling member in response to the exertion of a relatively small force.

Another object of the invention is to provide novel and improved means for mounting the spring or springs which are used to urge the coupling member in the direction of the pivot axis.

A further object of the invention is to provide a hinge joint which can be installed in existing seats in motor vehicles or in other types of existing seats as a superior substitute for heretofore used conventional hinge joints.

The invention is embodied in a hinge joint which can be used with advantage to change the mutual positions (particularly the mutual inclination) of two portions of a seat, such as the driver's seat in a motor vehicle or the seat next to the driver's seat. The improved hinge joint comprises first and second components or leaves, and means for pivotally connecting the components with each other. The connecting means comprises a coupling member (e.g., in the form of a shaft) which defines a pivot axis and comprises a cylindrical first portion journalled in one of the components, and first and second conical (preferably frustoconical) portions which constitute fulcra for the other component. The axis of the first portion is parallel with the pivot axis and the control portions have a common axis which coincides with the pivotal axis, i.e., the cylindrical portion is eccentric with reference to the conical portions. The hinge joint further comprises resilient means directly or indirectly reacting against one of the components and biasing the coupling member in the direction of the pivot axis so as to urge at least one of the conical portions against the other component. The cylindrical portion is preferably disposed between the conical portions, and the other component then comprises axially spaced apart first and second sections which respectively surround the first and second conical portions.

The connecting means further comprises a gear transmission and/or other suitable means for releasably holding the first and second components in selected angular positions relative to each other.

The orientation of the conical portions can be such that the diameter of one conical portion increases in a direction toward and the diameter of the other conical portion increases in a direction away from the cylindrical portion of the coupling member. Alternatively, the diameter of each conical portion can decrease in a direction toward the cylindrical portion. The coupling member then preferably comprises a core which is non-rotatably received in a central passage of one of the conical portions so that the core and the one conical portion can move axially relative to each other, i.e., the one conical portion can move axially relative to the other conical portion and relative to the cylindrical portion of such coupling member. The core can have a polygonal cross-sectional outline, and the central passage of the one conical portion is then preferably surrounded by an internal surface having a polygonal cross-sectional outline conforming to the cross-sectional outline of the peripheral surface of the core.

Antifriction bearing means can be interposed between the cylindrical portion of the coupling member and the one component.

In accordance with a presently preferred embodiment of the invention, one of the conical portions has a maximum-diameter end adjacent the cylindrical portion and the other conical portion has a minimum-diameter end adjacent the cylindrical portion. The diameter of the cylindrical portion at least equals or matches but can exceed the maximum diameter of the one conical portion, and the minimum diameter of the other conical portion at least equals or matches but can exceed the diameter of the cylindrical portion. Moreover, the one conical portion does not exceed radially beyond the cylindrical portion and the cylindrical portion does not extend radially beyond the other conical portion. This contributes to simplification of assembly of the hinge joint.

The resilient means can comprise a diaphragm spring which (directly or indirectly) reacts against the other component of the hinge joint.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged sectional view as seen in the direction of arrows from the line II—II of FIG. 1;

FIG. 4 is a fragmentary sectional views of a modified hinge joint; and

FIG. 5 is a fragmentary sectional view as seen in the direction of arrows from the line V—V of FIG. 2.

DESCRIPTION OF THE PREFERRED EMBODIMENTS

Figure 1:
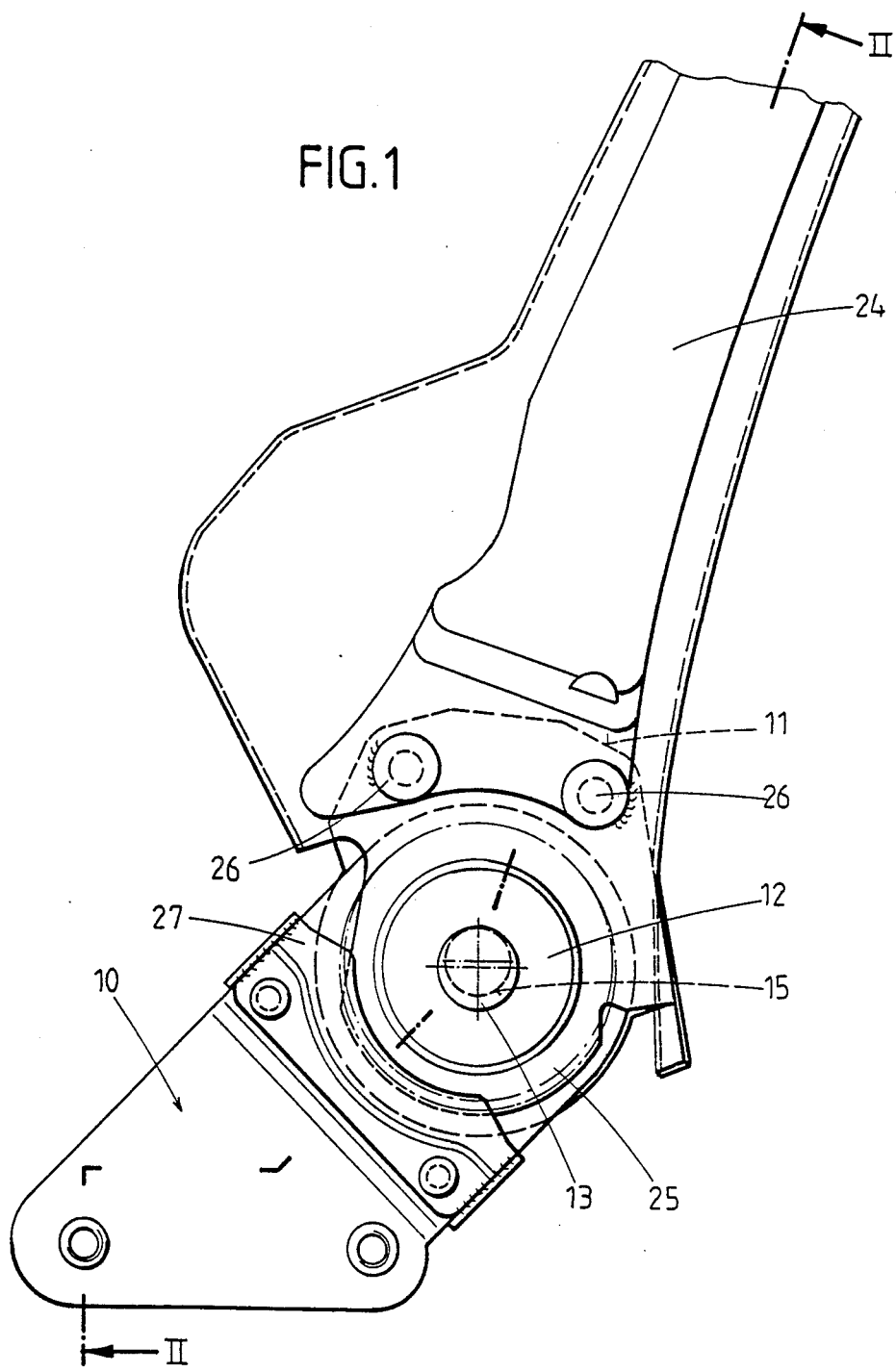
FIG. 1 is a side elevational view of a hinge joint which embodies one form of the invention.

Referring first to FIGS. 1 to 4, there is shown a hinge joint which can be used to pivotally connect the back 24 of a seat in a motor vehicle to the body supporting portion of the seat. The body supporting portion is rigid with a first component 10 which can be raised, lowered or moved forwardly or backwards in a manner not forming part of the invention, and a second component 11 which is rigidly connected to the back 24 of the seat and can be pivoted relative to the component 10 about a pivot axis A defined by a shaft-like coupling member 12. In accordance with a feature of the invention, the coupling member 12 (hereinafter called shaft for short) comprises an eccentric cylindrical portion 15 whose axis B is parallel to the pivot axis A, a first conical portion 13 at one axial end of the cylindrical portion 15, and a second conical portion 14 at the other axial end of the cylindrical portion 15. The common axis of the conical portions 13, 14 coincides with the pivot axis A, i.e., the cylindrical portion 15 is eccentric with reference to the conical portions 13 and 14.

The conical portion 14 of the shaft 12 is disposed between the cylindrical portion 15 and a cylindrical portion 16 whose axis coincides with the pivot axis A and with the axis of a further (smaller-diameter) cylindrical portion or stub 17 non-rotatably carrying a hand wheel (not shown), e.g., of the type disclosed in commonly owned U.S. Pat. No. 4,56,039. The hand wheel serves to manipulate the mechanism which includes the shaft 12 and serves to releasably lock the component 11 and the back 24 of the seat in any one of a desired number of different angular positions relative to the component 10. In addition to or in lieu of the hand wheel, the shaft 12 can be rotated by a suitable motor, not shown, in a manner well known from the art of hinge joints for the seats of motor vehicles.

Figure 3:
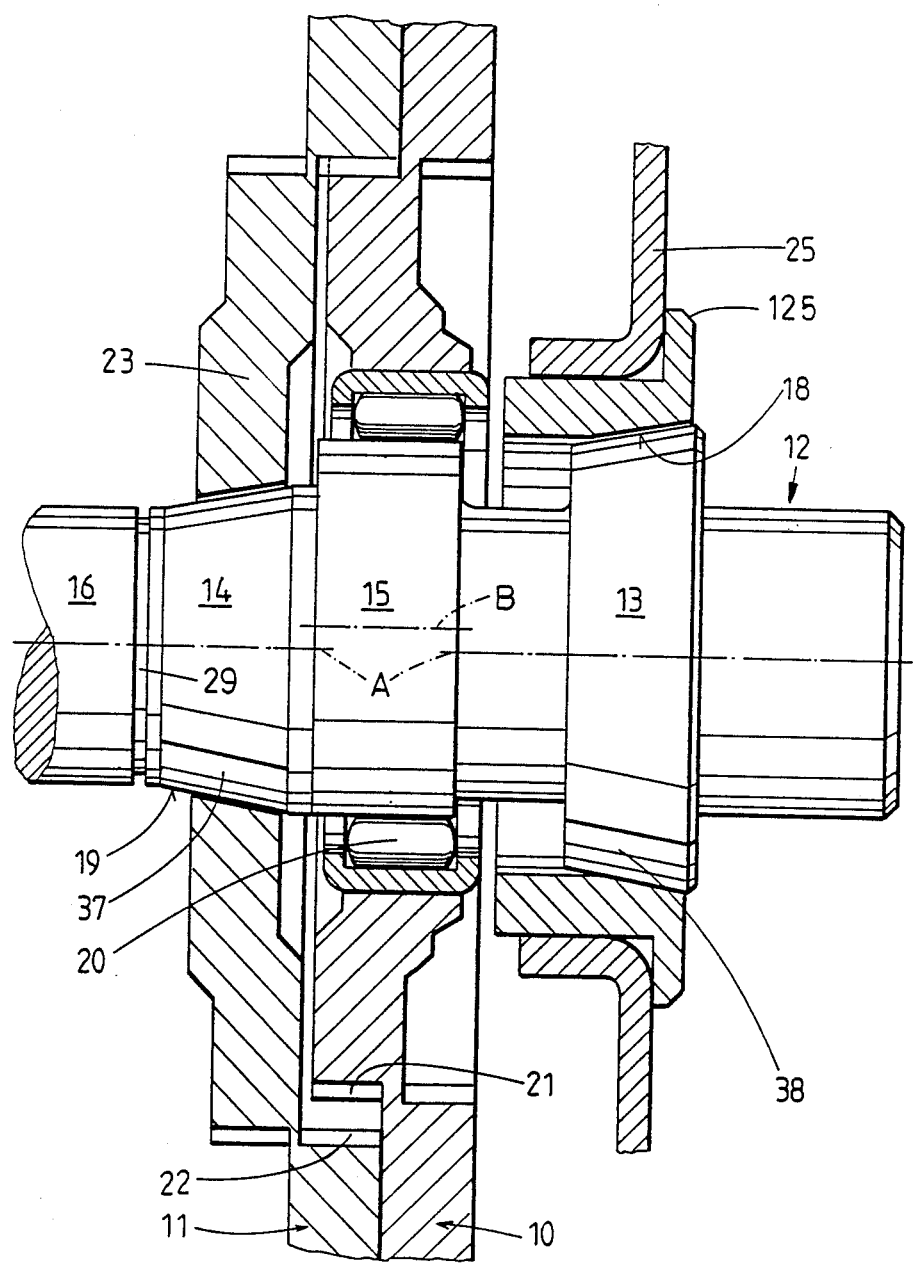
FIG. 3 is an enlarged view of a detail in the hinge joint of FIG. 2, with the coupling member and the two components of the hinge joint turned through 180 degrees.

FIGS. 2 and 3 show that the diameter of the smaller conical portion 14 increases in a direction toward and that the diameter of the larger conical portion 13 increases in a direction away from the eccentric cylindrical portion 15. Furthermore, the diameter of the cylindrical portion 15 preferably matches or exceeds the maximum diameter of the conical portion 14, and the minimum diameter of the conical portion 13 preferably matches or exceeds the diameter of the cylindrical portion 15. The conical portion 14 does not extend radially beyond the cylindrical portion 15, and the cylindrical portion does not extend radially beyond the conical portion 13. This renders it possible to readily insert the shaft 12 into the components 10 and 11 in a direction from the left, as seen in FIG. 2 (i.e., from the right, as seen in FIG. 3).

The means for releasably locking the component 11 in a selected angular position with reference to the component 10 comprises a spur gear 21 which can constitute an integral part of the component 10 and can be formed in a suitable stamping or punching machine, preferably in a manner as disclosed in commonly owned U.S. Pat. No. 4,563,039. The spur gear 21 constitutes an axially offset portion of the component 10 and surrounds an antifriction bearing 20 which, in turn, surrounds the eccentric cylindrical portion 15 of the shaft 12. The locking means further comprises an internal gear 22 which is part of the component 11 and surrounds the spur gear 21. The number of teeth of the gear 22 exceeds the number of teeth of the spur gear 21 by at least one, and the addendum circle of the spur gear 21 is smaller than the dedendum circle of the internal gear 22. The difference between the diameters of the two circles matches or exceeds the height of a tooth. The internal gear 22 is integral with an axially offset section 23 of the component 11, and the section 23 surrounds the conical portion 14 of the shaft 12. The section 23 has a centrally located opening which is surrounded by a frustoconical surface whose taper can match the taper of the peripheral surface 19 of the conical portion 14. The component 11 further comprises a section 25 which is affixed to the main portion (including 22 and 23) of the component 11 by rivets 26 or in any other suitable way and surrounds a sleeve 125 having a frustoconical internal surface which is complementary to the peripheral surface 18 of the conical portion 13. The common axis of the internal gear 22 and sleeve 125 coincides with the pivot axis A. If desired, the section 23 of the component 11 can be integral with the back 24 of the seat.

The means for holding the components 10 and 11 in required axial positions so that the internal gear 22 surrounds the spur gear can comprise two segment-shaped retaining members 27, 28 which are welded, bolted, screwed, riveted or otherwise permanently or detachably secured to opposite sides of the component 10. The retaining member 27 overlies the section 25 and the retaining member 28 overlies the section 23 of the component 11, and the sections 23, 25 flank the component 10.

The means for biasing the shaft 12 axially (to the right, as seen in FIG. 2) comprises a diaphragm spring 33 which reacts against the section 23 of the component 11 and bears upon a ring 32 which surrounds the cylindrical portion 16 of the shaft 12. The cylindrical portion 16 has two circumferential grooves 29, 30 for split rings 129, 130. The split ring 130 abuts a washer 31 which surrounds the cylindrical portion 16 and cooperates with the split ring 129 to confine the ring 32 for the radially innermost portion of the diaphragm spring 33. The diaphragm spring 33 is installed in prestressed condition so that it stores energy and permanently biases the shaft 12 in a direction to pull the conical portion 14 deeper into the central opening of the section 23 and a pull the conical portion 13 deeper into the sleeve 125. Initial stressing of the diaphragm spring 23 ensures that the gears 21, 22 are held against radial movement relative to each other when the occupant of the seat or another person has selected a desired inclination of the back 24 and component 11 relative to the component 10.

In order to increase the area of contact between the shaft 12 and the components 10, 11 of the improved hinge point, the curvature of the lower portion 37 (as seen in FIG. 2, 3 or 5) of the peripheral surface 19 of the conical portion 14 deviates from the curvature of the remaining (major) portion of the peripheral surface 19, and the curvature of the lower portion 38 of the peripheral surface 18 deviates from the curvature of the remaining (major) portion of the peripheral surface 18. The portions 38, 37 of the peripheral surfaces 18, 19 are disposed diametrically opposite the radially outermost portion or apex of the eccentric cylindrical portion 15 of the shaft 12 (with reference to the pivot axis A). As can be seen in FIG., 5, the centers of curvature of the portions 38, 39 are not located on the pivot axis A, and the curvature of the portions 38, 37 is less pronounced than that of the remaining portions of the respective peripheral surfaces 18, 19. This ensures that the portions 38, 37 are out of contact with the respective sections (25, 125 and 23) of the component 11 between the points or lines 39, 40 (see FIG. 5). The eccentric cylindrical portion 15 contacts the spur gear 21 of the component 10 at the point or line 41 (FIG. 5) so that the shaft 12 is invariably in satisfactory three-point contact with the components 10 and 11.

When the aforementioned hand wheel or motor is caused to turn the shaft 12 relative to the component 10 about the axis B, static friction between the shaft 12 and the components 10, 11 (such static friction is enhanced by the diaphragm spring 33) is changed into sliding friction. The forces acting radially of the conical portions 13, 14 have axial components which overcome the force of the spring 33 and the sliding friction (such sliding friction assists the bias of the spring 3) so that the shaft 12 is moved to the left, as seen in FIG. 2, to thus facilitate angular adjustment of the back 24 relative to the component 10 about the pivot axis A because axial shifting of the shaft 12 compensates for radial tolerances. The force which is required to turn the component 11 and back 24 relative to the component 10 about the axis A remains unchanged in the course of actual adjustment. The taper of the conical surfaces 18, 19 and of the complementary conical internal surfaces of the sections 25, 125 and 23 of the component 11 is preferably selected in such a way that the so-called static friction angle is within the self-locking range. The feature that the shaft 12 has two conical portions 13, 14 (for the two sections 25, 125 and 23 of the component 11) ensures that the shaft 12 cannot lie askew and cannot jaw in the components 10, 11, i.e., the force which is required to change the inclination of the component 11 and back 24 relative to the component 10 is not increased as a result of undesirable jamming and/or other stray movements of the shaft 12 with attendant generation of forces which would oppose angular displacement of the component 11 and back 24. Another advantage of the improved hinge joint is that manufacturing and/or machining tolerances cannot and do not contribute to an intensification of the force which is required to change the inclination of the component 11 and back 24 because such tolerances are effectively compensated for by smaller or larger axial displacement of the shaft 12 with reference to the components 10 and 11. Thus, the extent of axial movement of the shaft 12 is a function of the magnitude of machining and/or manufacturing tolerances, i.e., axial shifting of the shaft 12 is less pronounced if the tolerances are smaller.

An advantage of the improved hinge joint is that the conical portions 13, 14 of the shaft 12 cooperate with the spring 33 to eliminate radial play between the gears 21, 22 as well as between the shaft and the components 10, 11 when the adjustment of the inclination of the component 11 and back 24 is completed. In addition, the conical portions 13, 14 of the shaft 12 are in desirable large-area or multiple-point contact with the components 10 and 11, even if the shaft lies askew, i.e., even if the inclination of the axis A deviates from an optimum inclination. Since the shaft 12 need not be turned by applying a large force, it is possible to make the shaft of less expensive material and to thus contribute to simplicity, lower cost and a reduction of the weight of the entire hinge joint.

The feature that the conical surfaces 18, 19 taper in the same direction is desirable and advantageous because this contributes to lower cost of making the shaft 12. The same holds true for the taper of surfaces which surround the conical portions 13, 14 and are respectively provided in the sections 25, 125 and 23 of the component 11.

As mentioned above, the feature which can be best seen in FIG. 3 (namely that the conical portion 14 does not extend radially beyond the cylindrical portion 15 and the cylindrical portion 15 does not extend radially beyond the conical portion 13) contributes to convenience of assembling the improved hinge joint because the shaft 12 can be introduced into the assembled components 10, 11 from the outer side of the section 25 and its sleeve 125.

The bearing 20 constitutes an optional but desirable feature of the improved hinge joint. This bearing renders it possible to turn the shaft 12 relative to the component 10 with the exertion of a relatively small force.

FIG. 4 shows a portion of a modified hinge joint wherein the shaft 12' has a core 34 with a polygonal cross-sectional outline which is received in a complementary passage 114' of the conical portion 14'. The latter cannot rotate on but is movable axially of the cylindrical portion 15 and conical portion 13. The diameter of the conical portion 14' increases in a direction away from the cylindrical portion 15, the same as the diameter of the conical portion 13. For example, the core 34 can have a square cross-sectional outline, the same the cross-sectional outline of the surface bounding the central passage 114' of the conical portion 14'.

The conical portion 14' is biased axially toward the cylindrical portion 15 (i.e., deeper into the sleeve 125 of the section 25) by a diaphragm spring 36 which bears against the adjacent end face of the conical portion 14' and reacts against a ring 32 abutting a washer 31 which, in turn, abuts the split ring 130 on the cylindrical portion 16 of the shaft 12'. Since the section 25 is rigid with the section 23 of the component 11, the diaphragm spring 36 biases the conical internal surface of the section 23 against the peripheral surface of the conical portion 13.

The mode of operation of the hinge joint of FIG. 4 is analogous to that of the hinge joint which is shown in FIGS. 1-3 and 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hinge joint, particularly for changing the mutual positions of two portions of a seat, comprising first and second components; means for pivotally connecting said components with each other including a coupling member defining a pivot axis and comprising a cylindrical first portion journalled in one of said components and first and second conical portions constituting fulcra for the other of said components, said first portion having an axis which is parallel to said pivot axis and said conical portions having a common axis which coincides with said pivot axis; and resilient means reacting against one of said components and biasing said coupling member in the direction of said pivot axis.

2. The hinge joint of claim 1, wherein said cylindrical portion is disposed between said conical portions and said other component comprises first and second sections flanking said one component and respectively surrounding said first and second conical portions.

3. The hinge joint of claim 2, wherein said connecting means further comprises means for releasably holding said components in selected angular positions relative to each other.

4. The hinge joint of claim 2, wherein the diameter of one of said conical portions increases in a direction toward and the diameter of the other of said conical portions increases in a direction away from said cylindrical portion.

5. The hinge joint of claim 2, wherein the diameter of each of said conical portions decreases in a direction toward said cylindrical portion.

6. The hinge portion of claim 5, wherein said coupling member further comprises a core, one of said conical portions having a central passage non-rotatably but axially movably receiving said core.

7. The hinge joint of claim 6, wherein said core has a polygonal cross-sectional outline.

8. The hinge joint of claim 2, further comprising antifriction bearing means interposed between said cylindrical portion and said one component.

9. The hinge joint of claim 2, wherein one of said conical portions has a maximum-diameter end adjacent said cylindrical portion and the other of said conical portions has a minimum-diameter end adjacent said cylindrical portion, the diameter of said cylindrical portion at least matching the maximum diameter of said one conical portion and the minimum diameter of said other conical portion at least matching the diameter of said cylindrical portion.

10. The hinge joint of claim 2, wherein said resilient means comprises a diaphragm spring.

11. The hinge joint of claim 10, wherein said diaphragm spring reacts against said other component.

* * * * *